Aug. 6, 1929.　　　　N. L. TODD　　　　1,723,901

LOCK DIFFERENTIAL GEARING

Filed Dec. 26, 1928　　　3 Sheets-Sheet 1

Norman L. Todd,
INVENTOR

BY Victor J. Evans
ATTORNEY

WITNESS: P. J. Hickey.

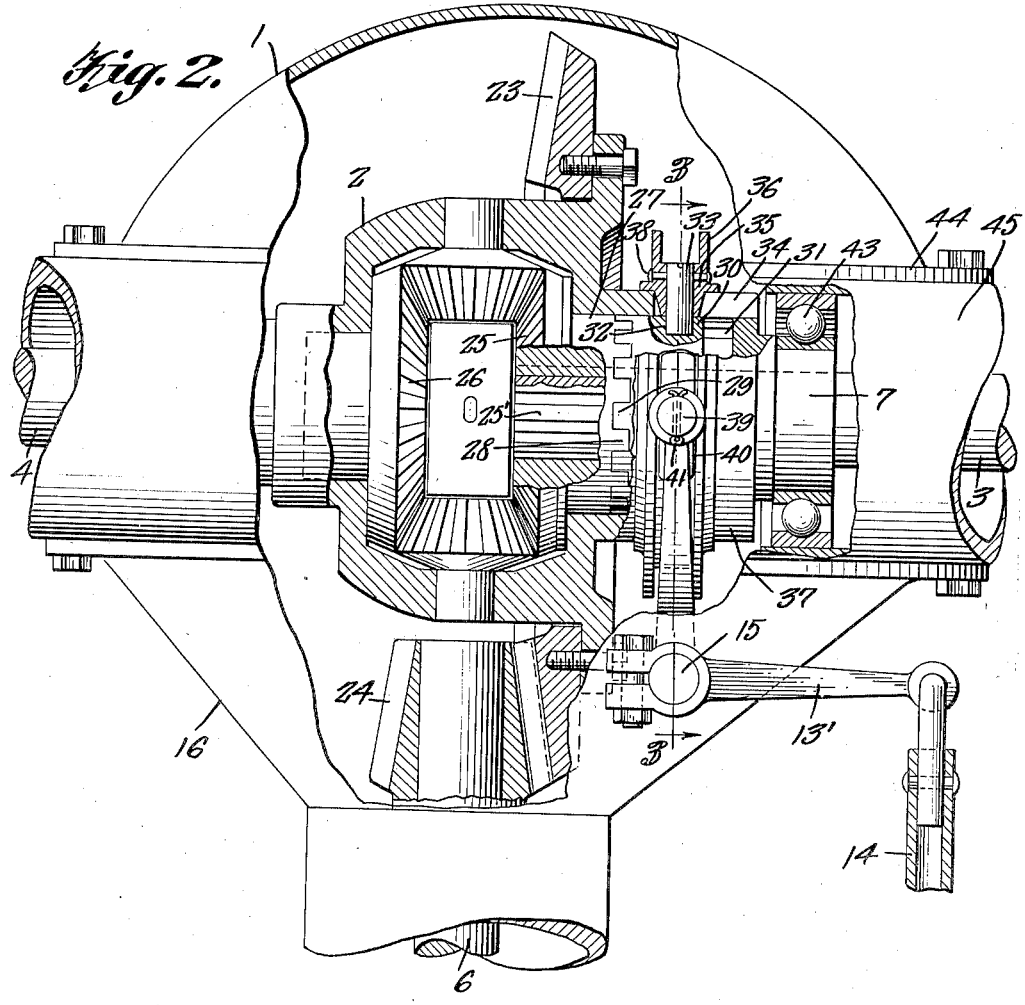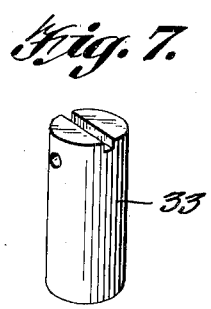

Aug. 6, 1929.  N. L. TODD  1,723,901
LOCK DIFFERENTIAL GEARING
Filed Dec. 26, 1928   3 Sheets—Sheet 3

Registered Aug. 6, 1929.

1,723,901

UNITED STATES PATENT OFFICE.

NORMAN L. TODD, OF ASHLAND, NEW JERSEY.

LOCK DIFFERENTIAL GEARING.

Application filed December 26, 1928. Serial No. 328,330.

My invention relates to improvements in differentials of motor driven machines in which a foot pedal controlled differential clutch operates in conjunction with the differential; and the objects of my improvement are, first, to unite differential gears and axle shafts in one unit with the drive or ring gear at will by foot pedal at front, or other accessible part of machine within reach of operator; second, to provide motive power to axle shafts when right or left propelling wheel slips or spins; third, to afford facilities for free installing or removing of differential and clutch without removing shifting assembly, also the extraction of differential gears without removing clutch assembly; fourth wherein a differential clutch can be applied to all makes of differentials, and fifth to accomplish the said improvements by a compact medium of parts which have but little effect upon the usual construction of differentials.

For a full and comprehensive understanding of the invention, reference is to be had to the drawings which accompany and form part of this application.

In the drawings:

Figure 2 is a plan view of the differential housing with parts broken away and parts of the invention in section.

Figure 7 is a similar view of one of the pins for slidably keying the race ring, and the clutch ring together.

Figure 1:
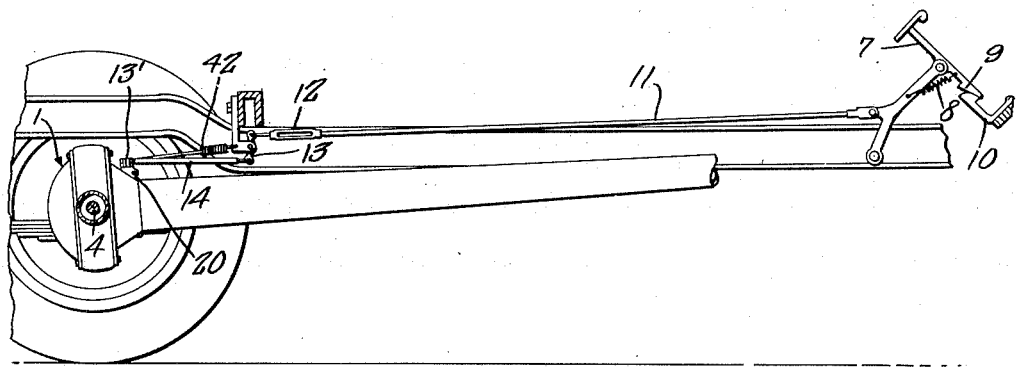
Figure 1 is a side elevation, with parts in section, of an automobile equipped with the improvement.

The differential housing, in the showing of the drawings, is indicated by the numeral 1, the differential case which is supported in the housing 1 by the numeral 2, and the drive axles by the numerals 3 and 4. There are arranged in the housing 1 and associated with the differential case 2 the differential pinions which will hereinafter be referred to in detail. The engine drive shaft is indicated by the numeral 6.

Figure 3:
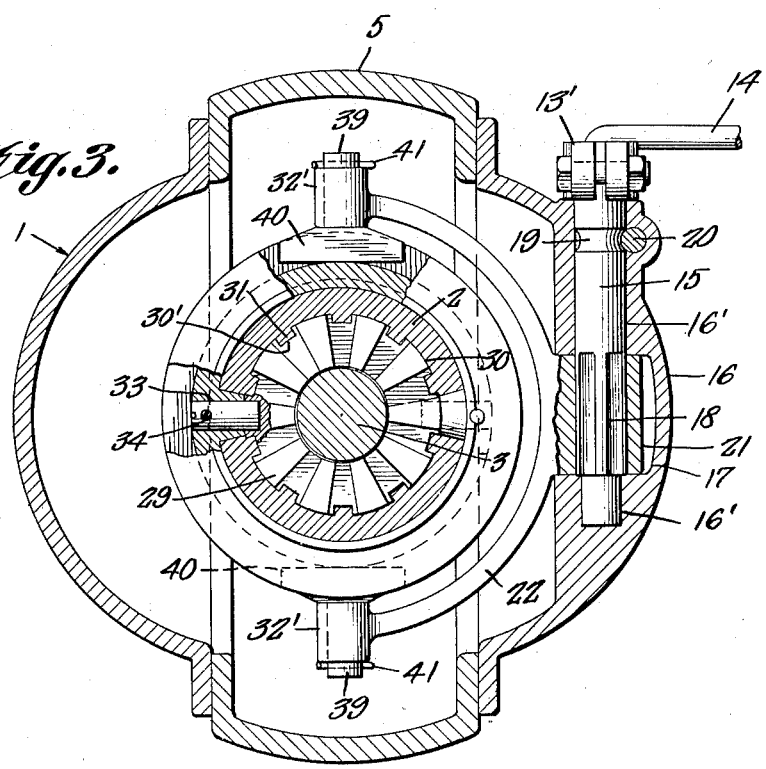
Figure 3 is a sectional view approximately on the line 3—3 of Figure 2.
Figure 4:
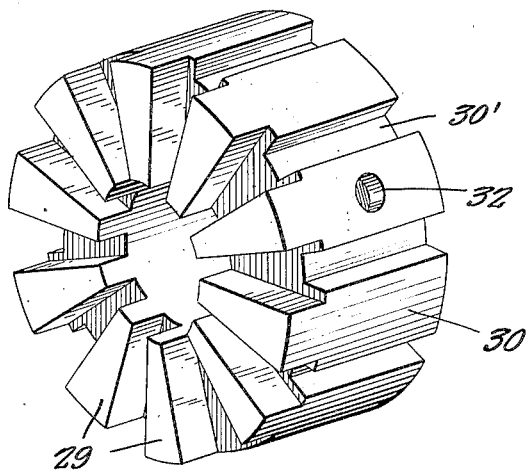
Figure 4 is a perspective view of the clutch ring.
Figure 5:
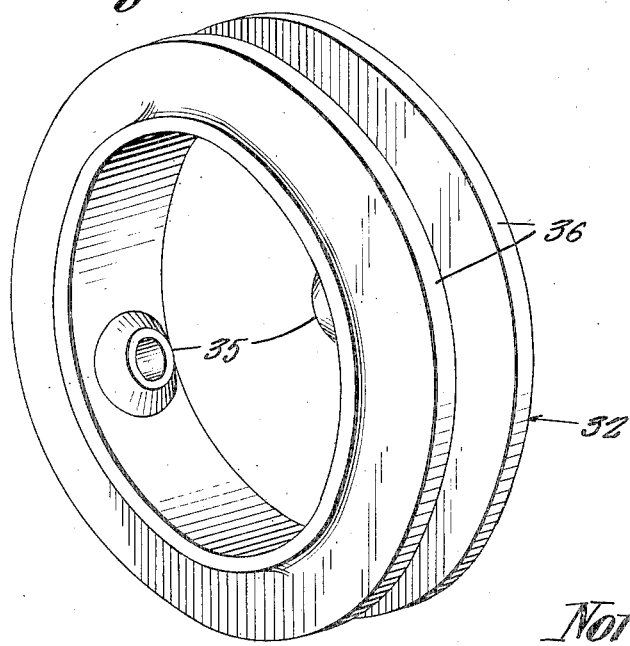
Figure 5 is a similar view of the race ring.
Figure 6:
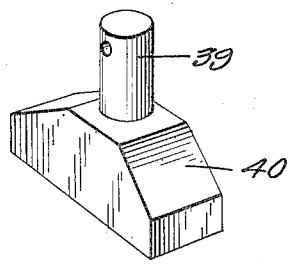
Figure 6 is a perspective view of one of shifting shoes.

At the forward end of the automobile frame there is provided a differential clutch pedal 7 which is influenced by a spring 8 to bring a lug 9 thereon into engagement with the clutch lug 10. A downward pressure upon the outer end of the pedal will release the clutching engagement between the elements 9 and 10. The pedal 7 is provided with a lug to which there is removably pivoted a rod 11 that is made up of two or more sections, and connected by a turn buckle 12. The outer section of the rod 11 is connected with one end of a centrally pivoted reverse lever 13, the second end of the lever being secured to a rod made up of riveted tubular sections 14 of hard material. This rod 14 attaches the reverse lever to the shifting lever 13' of the improvement. The shifting lever has a round and bifurcated end and the ears provided by the bifurcation have passed therethrough a bolt for rigidly securing the said lever to a shifting shaft 15 that enters a bearing opening in a carrier plate 16 of the drive shaft housing and which is bolted to the differential housing. I either secure on or form the carrier plate 16 with a bearing 16' for the shifting shaft 15. The lower bore of the bearing is reduced, and directly thereabove the said bore is formed with a pocket or depression 17. This depression 17 is designed for the reception of the hub 21 on the center of a shifting yoke 22. The bore of the hub is either squared or ribbed to coengage with similar square or ribbed surfaces 18 on the shifting shaft 15, the portion of the shaft 15, below the said ribbed or squared portion being received in the reduced end of the bore of the bearing. By this arrangement it will be noted that the shifting shaft may be readily inserted in the bore of the bearing and lockingly engage with the hub 21 of the yoke 22. The shaft 15 is provided with an annular depression, and there is passed transversely through the bearing 16' a round pin or bolt 20 that is received in the depression and holds the shaft from longitudinal movement in the bearing 19. The ears on the bifurcated end of the member 13' are compressed by a bolt which is engaged by a clamping nut, as disclosed by Figures 2 and 3 of the drawings, so that the member 13' can be readily secured on or removed from the shifting shaft.

The driven gear of the differential, which is bolted to the casing 2, is indicated by the numeral 23 and is in mesh with the drive pinion 24 on the engine driven shaft 6. The case 2 receives therein the pinions 25 and 26 which are keyed or splined, as at 25', to the respective axle shafts 3 and 4. The pinions 25 and 26 are in mesh with the usual differential pinions that are journaled in the case 2.

The pinion 25 has a hub 27 which finds a bearing in the case 2, and the outer face of this hub is provided with equidistantly spaced squared teeth or jaws 28. The teeth or jaws are arranged opposite similar teeth or jaws 29 on one end of a clutch or jaw ring 30 through whose bore the axle 3 freely revolves. The outer face or periphery of the jaw ring 30 is provided with a series of equidistantly spaced longitudinally arranged notches 30' disposed between the teeth or jaws 29. These notches receive therein longitudinally arranged tongues 31 that project into the bore at the reduced and rounded end of the case 2 in which the hub 27 of the pinion 25 and the jaw ring 30 are received.

On its periphery, between the grooves 30' the jaw ring 30 is formed with diametrically opposite rounded depressions 32 that receive therein bolts or pins 33 that pass through longitudinally arranged elongated openings 34 in the referred to end of the case 2. These bolts also pass through lugs 35 on the inner periphery of a flanged clutch race-ring 36 which is arranged around the mentioned reduced end portion 37 of the case 2. The lugs 35 are received through the slots 34, and the pins or bolts 33 have passed through openings therein locking pins 38 which also pass through the thickened lower portion or periphery of the clutch raceway. The outer ends of the bolts or pins 33 do not project between the flanges of the clutch race ring.

The arms of the fork 22 have their ends rounded and provided with openings that afford bearings for stub shafts 39 on clutch shoes 40, the said shoes being received between the flanges of the clutch ring 36. There are passed through openings in the stub shafts 39 cotter pins or like elements 41 for securing the said stub shafts in their bearings in the arms of the yoke or fork 22.

By reference to Figure 1 of the drawings it will be seen that there is connected between the center of the reverse lever 13 and the angle end of the bar 14 a release spring 42.

It will be noted that my construction is such that the same may be easily applied, the parts thereof repaired or disassociated should occasion require. It is to be further noted that the jaws 28 and 29 of the hub 27 and the clutch ring 30 are so divided as to resist shock imparted to them by movement of the side gear or clutch in alinement of jaws when engaging clutch, pinion 25 having no connection with clutch can be freely removed or replaced or may be extended to insure proper thrust bearing surface with case 2, while the turn buckle 12 insures adjustment of the clutch pedal lock.

The action of the differential clutch with the differential may be briefly described as follows: The engine drive shaft 6, pinion gear 24, driven gear 23 turns case 2. As disclosed by the drawings the case has its ends journaled in roller bearings 43 that are suitably caged and carried by the carrier 16 and axle housing cover 44. The axle housing cover and carrier are bolted to axle housing 45 for axles 3 and 4. The case 2 carries the intermeshing pinions of the differential as previously described and, of course, the axles 3 and 4 rotate propelling wheels (not shown) and the clutch action or purpose of these medium of parts is to check rotary action of differential side and pinion gears allowing only differential case to rotate with the movement of drive gear, carrying axle shafts with it. The clutching and unclutching of the jaws on the hub of the pinion 25 and the jaws on the clutch ring 30 is, of course, actuated by the operation of the differential clutch pedal 7.

I am aware that prior to my invention clutches, differentials and carriers, axle housings, foot pedals, and other parts herein described to relate action of differential clutch, have been made. I therefore do not claim such a combination broadly; but I claim:

1. In a differential clutch, a case journaled in roller bearings in a differential housing, a driven gear fixed to the case and in mesh with the pinion of the driven shaft, meshing differential pinions journaled in the case, and two of the opposed pinions being splined with drive axles, one of said pinions having a hub journaled in the case and provided with jaw teeth, a slidable clutch ring in the case having jaw teeth for clutching engagement with the jaw teeth of the hub, said clutch ring having its outer periphery formed with spaced longitudinal depressions and the case having ribs which are received in the depressions, said case having oppositely disposed elongated openings, a flanged race ring on the case surrounding the openings and having lugs projecting into said openings, oppositely disposed pins passing through the race ring lugs and entering the periphery of the clutch ring, locking means for the pins, a fork having shoes pivoted to the ends thereof and received between the flanges of the race ring, a carrier plate for the differential housing having a bearing provided with an opening and also having a recess to receive the hub of the fork therein, a shaft journaled in the bearing and having a squared portion that is received through a squared bore in the hub of the fork, removable means for holding the shaft from longitudinal movement through the bearing, a rod having an offset end removably secured to the shaft, and connected to a centrally pivoted reverse lever, a relief spring between the pivot of the reverse lever and the differential housing, and a clutch pedal operated rod made up of connected sections having one end pivotally connected with the reverse lever.

2. In a differential clutch, a case journaled in roller bearings in a differential housing, a driven gear fixed to the case and in mesh with the pinion of the driven shaft, meshing differential pinions journaled in the case, and two of the opposed pinions being splined with drive axles, one of said pinions having a hub journaled in the case and provided with jaw teeth, a slidable clutch ring in the case having jaw teeth for clutching engagement with the jaw teeth of the hub, said clutch ring having its outer periphery formed with spaced longitudinal depressions and the case having ribs which are received in the depressions, said casing having oppositely disposed elongated openings, a flanged race ring on the case surrounding the openings and having lugs projecting into said openings, oppositely disposed pins passing through the race ring lugs and entering the periphery of the clutch ring, locking means for the pins, a fork having shoes pivoted to the ends thereof and received between the flanges of the race ring, a carrier plate for the differential housing having a bearing provided with an opening and also having a recess to receive the hub of the fork therein, a shaft journaled in the bearing and having a squared portion that is received through a squared bore in the hub of the fork, removable means for holding the shaft from longitudinal movement through the bearing, a rod having an offset end removably secured to the shaft, and connected to a centrally pivoted reverse lever, a relief spring between the pivot of the reverse lever and the differential housing, a rod made up of connected sections having one end pivotally connected with the reverse lever, a pivotal element to which the rod is secured, a clutch pedal pivoted on said element, spring means urging the clutch pedal in one direction, a lug on the clutch pedal and a fixed lug engageable with said pedal lug.

In testimony whereof I affix my signature.

NORMAN L. TODD.